(12) United States Patent
Chang et al.

(10) Patent No.: US 7,335,431 B2
(45) Date of Patent: Feb. 26, 2008

(54) FUEL CELL WITH EMBEDDED SERIES/PARALLEL MECHANISM

(75) Inventors: Tsang-Ming Chang, Taipei (TW);
Chun-Wei Pan, Taipei (TW);
Chia-Hao Chang, Taipei (TW)

(73) Assignee: ANTIG Technology Co., Ltd., Taipei (TW)

(*) Notice: Subject to any disclaimer, the term of this patent is extended or adjusted under 35 U.S.C. 154(b) by 0 days.

(21) Appl. No.: 11/739,247

(22) Filed: Apr. 24, 2007

(65) Prior Publication Data

US 2007/0254197 A1 Nov. 1, 2007

(51) Int. Cl.
*H01M 8/10* (2006.01)

(52) U.S. Cl. .............. 429/12; 429/30; 429/34
(58) Field of Classification Search .......... None
See application file for complete search history.

(56) References Cited

U.S. PATENT DOCUMENTS 6,410,176 B1* 6/2002 Genc et al. ............... 429/13

2007/0128496 A1* 6/2007 Chang et al. ............. 429/38
2007/0186415 A1* 8/2007 Shu et al. ................. 29/832

* cited by examiner

Primary Examiner—John S. Maples

(57) ABSTRACT

The present invention is a fuel cell with embedded series/parallel mechanism, which comprises: an anode circuit board including: anode current collector circuits; anode wirings which are electrically connected to these anode current collector circuit, respectively; anode pads which are configured at the board edge of the anode circuit board and electrically connected to these anode wirings; and, a cathode circuit board including: cathode current collector circuits; cathode wirings which are electrically connected to these cathode current collector circuits, respectively; and, cathode pads which are configured at the board edge of the cathode circuit board and electrically connected to these cathode wirings, in which each cathode pad is corresponding to one opposite anode pad; and, membrane electrode assemblies which are bonded and sandwiched between the anode circuit board and the cathode circuit board; U-shape connection terminals, each of which is clipped between a pair of anode pad and cathode pad in opposite on the anode circuit board and on the cathode circuit board, and the U-shape connection terminal is directly spot-welded and fixed on the paired anode pad and cathode pad without solder welding.

15 Claims, 6 Drawing Sheets

FUEL CELL WITH EMBEDDED SERIES/PARALLEL MECHANISM

FIELD OF THE INVENTION

The present invention relates to a fuel cell, and particularly a plate-type fuel cell with series/parallel mechanism for membrane electrode assembly.

BACKGROUND OF THE INVENTION

The conventional plate-type fuel cell must connect a plurality of membrane electrode assemblies in series/parallel to generate more and longer electricity, so as to provide sustaining electricity. However, in the conventional series/parallel implementation means, the surface of bipolar plate for plate-type fuel cell after thermal pressing procedure will have the Prepreg glue commonly used in the process of printed circuit board spilled out causing the welding spot being covered or blocked. Then, the operator should clear up the spilled glue, and proceed the welding operation. This process is not only time-consuming and labor-intensive, but also easy to damage the circuit itself. Currently, for the production elements asking for high efficiency and high quality, this problem is not only a challenge, but also needs to be solved.

The inventor of the present invention has been in view of the conventional problems, and worked on the improvement to create a fuel cell with embedded series/parallel mechanism, so as to overcome these conventional defects.

SUMMARY OF THE INVENTION

The main object of the present invention is to provide a fuel cell with embedded series/parallel mechanism, which could prevent the damage to the membrane electrode assembly in the operation during the series/parallel connection operation for each membrane electrode assembly.

To this end, the present invention provides a fuel cell with embedded series/parallel mechanism, which comprises: an anode circuit board including: at least one anode current collector circuit; at least one anode wiring, in which these anode wirings are electrically connected to these anode current collector circuit, respectively; at least one anode pad, and these anode pads are configured at the board edge of the anode circuit board, and these anode pads are electrically connected to these anode wirings; and, a cathode circuit board including: at least one cathode current collector circuit; at least one cathode wiring, in which these cathode wirings are electrically connected to these cathode current collector circuits; and, at least one cathode pad, and these cathode pads are configured at the board edge of the cathode circuit board, and these cathode pads are electrically connected to these cathode wirings, in which each cathode pad is corresponding to one opposite anode pad; and, at least one membrane electrode assembly, which is bonded and sandwiched between the anode circuit board and the cathode circuit board, and these membrane electrode assemblies are sandwiched between these anode current collector circuits and these corresponding cathode current collector circuits one by one; at least one U-shape connection terminal, which is clipped between a pair of anode pad and cathode pad in opposite on the anode circuit board and on the cathode circuit board, and the U-shape connection terminal is directly spot-welded and fixed on the paired anode pad and cathode pad without solder welding.

Furthermore, the present invention provides a fuel cell with embedded series/parallel mechanism, which comprises: an anode circuit board including: at least one anode current collector circuit; at least one anode wiring, in which these anode wirings are electrically connected to these anode current collector circuit, respectively; at least one flexible anode pad, in which these flexible anode pads are configured at the board edge of the anode circuit board, and a partial area of the flexible anode pad is protruded outside the anode circuit board, and these flexible anode pads are electrically connected to these anode wirings; and, a cathode circuit board including: at least one cathode current collector circuit; at least one cathode wiring, in which these cathode wirings are electrically connected to these cathode current collector circuits; at least one cathode pad, and these cathode pads are configured at the board edge of the cathode circuit board, and these cathode pads are electrically connected to these cathode wirings, in which each cathode pad is corresponding to one opposite flexible anode pad; and, at least one membrane electrode assembly, which is bonded and sandwiched between the anode circuit board and the cathode circuit board, and these membrane electrode assemblies are sandwiched between these anode current collector circuits and these cathode current collector circuits one by one; wherein, the protruded area of the flexible anode pad is bent and attached to the opposite cathode pad, and is conducted with direct spot-welding on the bent and attached anode pad without solder welding, so as to bond the paired flexible anode pad and cathode pad together.

Moreover, the present invention provides a fuel cell with embedded series/parallel mechanism, which comprises: a cathode circuit board including: at least one cathode current collector circuit; at least one cathode wiring, in which these cathode wirings are electrically connected to these cathode current collector circuit, respectively; at least one flexible cathode pad, in which these flexible cathode pads are configured at the board edge of the cathode circuit board, and a partial area of the flexible cathode pad is protruded outside the cathode circuit board, and these flexible cathode pads are electrically connected to these cathode wirings; and, an anode circuit board including: at least one anode current collector circuit; at least one anode wiring, in which these anode wirings are electrically connected to these anode current collector circuits, respectively; at least one anode pad, and these anode pads are configured at the board edge of the anode circuit board, and these anode pads are electrically connected to these anode wirings, in which each anode pad is corresponding to one opposite flexible cathode pad; and, at least one membrane electrode assembly, which is bonded and sandwiched between the anode circuit board and the cathode circuit board, and these membrane electrode assemblies are sandwiched between these anode current collector circuits and these corresponding cathode current collector circuits one by one; wherein, the protruded area of the flexible cathode pad is bent and attached to the opposite anode pad, and is conducted with direct spot-welding on the bent and attached cathode pad without solder welding, so as to bond the paired anode pad and flexible cathode pad together.

BRIEF DESCRIPTION OF DRAWINGS

The purpose and the effects of the present invention may be best understood by those skilled in the art by referring to the following detailed description of the preferred embodiments and the accompanying drawings, wherein.

DETAILED DESCRIPTION OF THE INVENTION

Figure 1A:
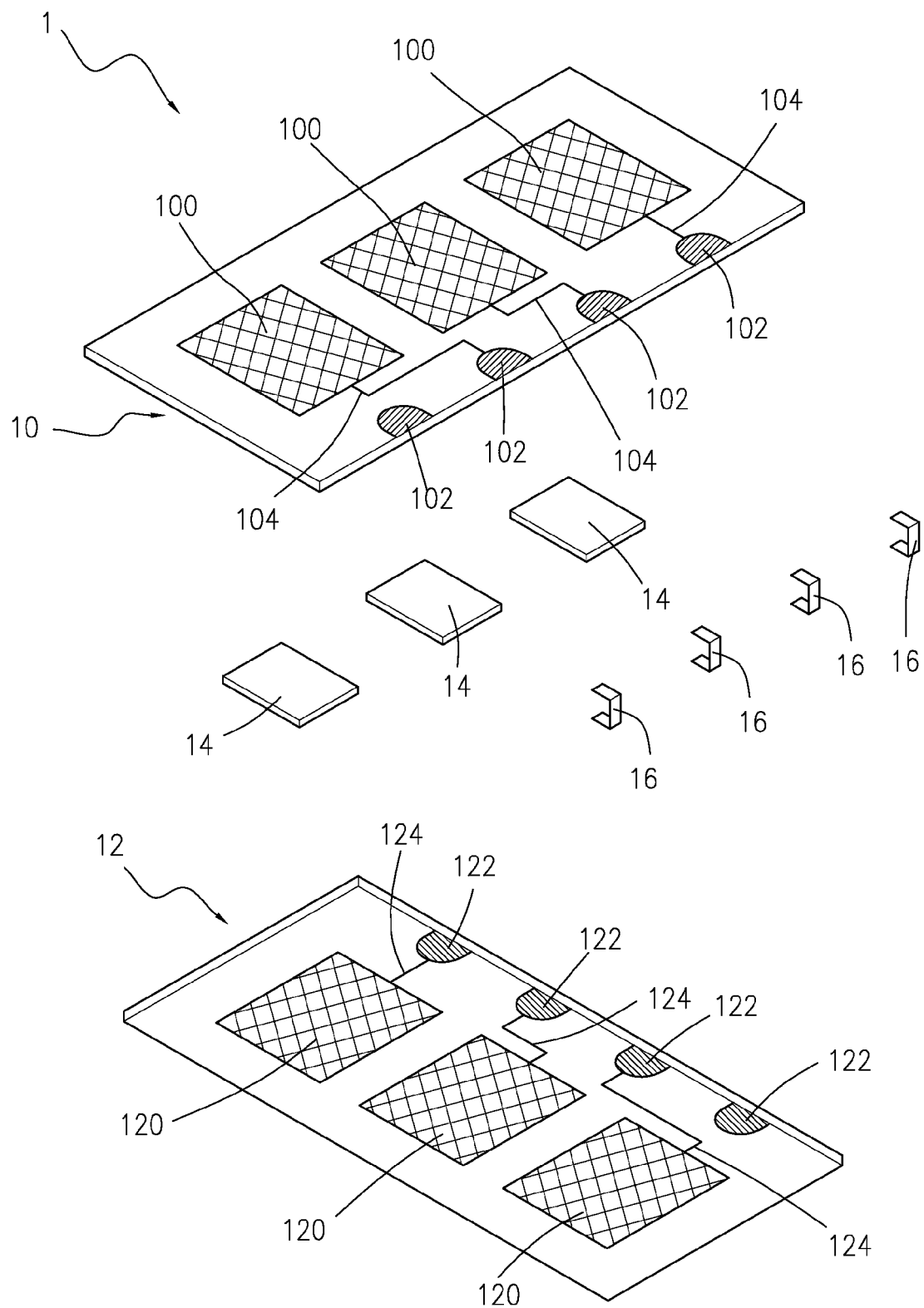
FIG. 1A is an exploded view for a fuel cell with embedded series/parallel mechanism of a first embodiment according to the present invention.

FIG. 1A is an exploded view for a fuel cell with embedded series/parallel mechanism of a first embodiment according to the present invention. The fuel cell 1 with embedded series/parallel mechanism according to the present invention mainly comprises: an anode circuit board 10, a cathode circuit board 12, at least one membrane electrode assembly 14, and at least one U-shape connection terminal 16; wherein, the anode circuit board 10 and the cathode circuit board 12 could employ the printed circuit board as the substrate, and employ the process for printed circuit board to form at least one anode current collector circuit 100, at least one cathode current collector circuit 120, at least one anode pad 102, at least one cathode pad 122, at least one anode wiring 104, and at least one cathode wiring 124 on the anode circuit board 10 and on the cathode circuit board 12, respectively; wherein, the anode wiring 104 and the cathode wiring 124 are the printed circuitry; and, the anode pad 102 and the cathode pad 122 are presented as a pattern of a semi-circle foil or a square foil. Moreover, specifically, the present invention is to configure these anode pads 102 and these cathode pads 122 on the board edge of the anode circuit board 10 and the cathode circuit board 12, and these anode pads 102 and these cathode pads 122 are presented with a relationship in top and down opposite position. The present invention further employs the anode wiring 104 and the cathode wiring 124 to connect and conduct each anode current collector circuit 100 and each anode pad 102 one by one, and connect and conduct each cathode current collector circuit 120 with each cathode pad 122 one by one.

Figure 1B:
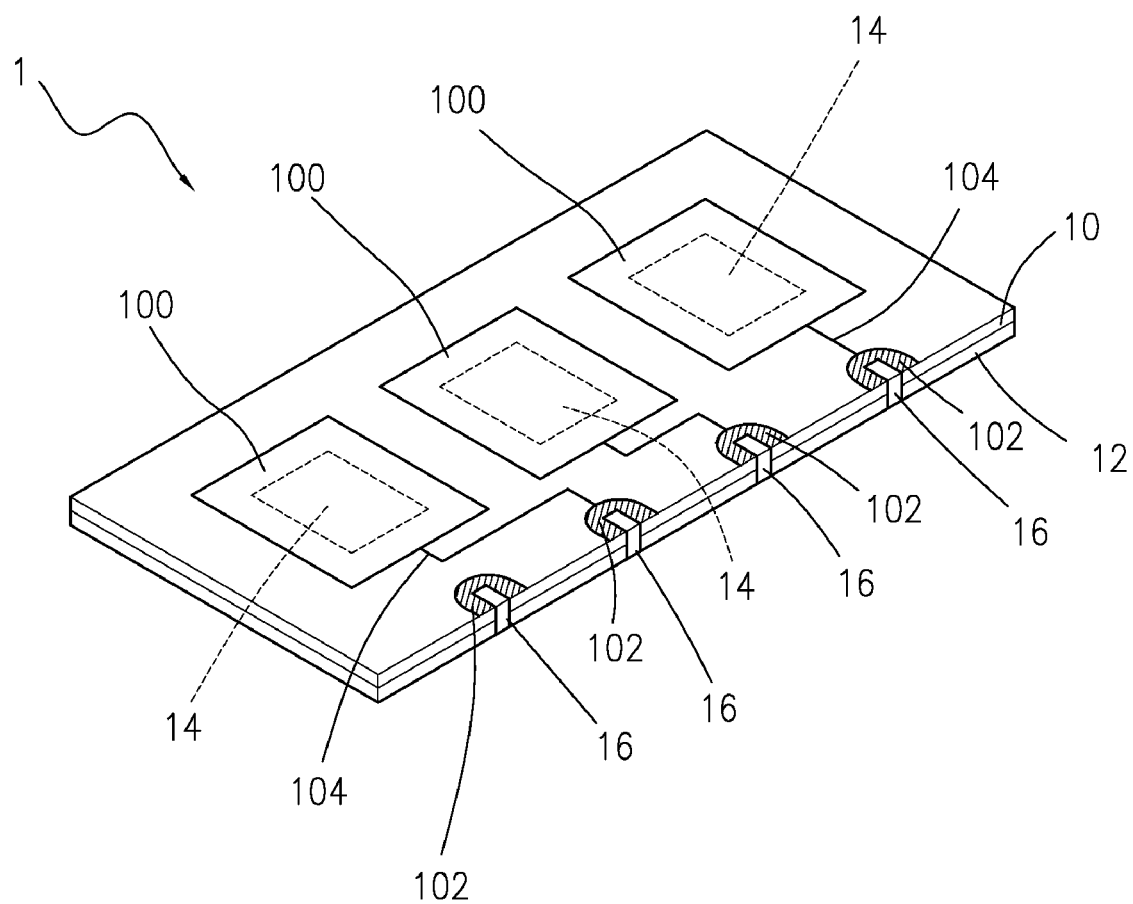
FIG. 1B is an elevation assembly diagram of FIG. 1A.

FIG. 1B is an elevation assembly diagram of FIG. 1A. When assembling the fuel cell 1 according to the present invention, each membrane electrode assembly 14 should be first aligned, and placed between each pair of anode current collector circuit 100 and cathode current collector circuit 120 in top and down correspondence. Next, the present invention employs at least one U-shape connection terminal 16 to clip each pair of anode pad 102 and cathode pad 122 in top and down opposite position; then, directly spot-welding the U-shape connection terminal 16 with the anode pad 102 and cathode pad 122 without solder welding, so as to connect and conduct each pair of anode pad 102 and cathode pad 122 in top and down opposite position; then, sequentially stacking the anode circuit board 10, these membrane electrode assemblies 14, and the cathode circuit board 12 from top to down for pressing.

As for the anode wiring 104 and cathode wiring 124 according to the present invention, when planning the design of circuit connection method, they could be based on the series or parallel connection pattern employed by these membrane electrode assemblies 14 in the future to layout the actual pattern for the anode wiring 104 and cathode wiring 124. Please refer to FIG. 1A, which shows the layout sample of anode wiring 104 on the anode circuit board 10, and the layout sample of cathode wiring 124 on the cathode circuit board 12. In FIG. 1B, the configuration of the anode wiring 104, the anode pad 102, the U-shape connection terminal 16, the cathode pad 122, and the cathode wiring 124 is to make each pair of anode current collector circuit 100 and cathode current collector circuit 120 in top and down correspondence to be able to form a layout of series connection with another neighbored pair of anode current collector circuit 100 and cathode current collector circuit 120.

The skilled in the art should understand that the present invention employs these anode wirings 104, these anode pads 102, these U-shape connection terminals 16, these cathode pads 122, and these cathode wirings 124 to implement the series/parallel mechanism of each membrane electrode assembly on the fuel cell 1. The skilled in the art could further modify the series/parallel connection method different from FIG. 1A and FIG. 1B, but these changes are still within the scope of the present invention.

Figure 2A:
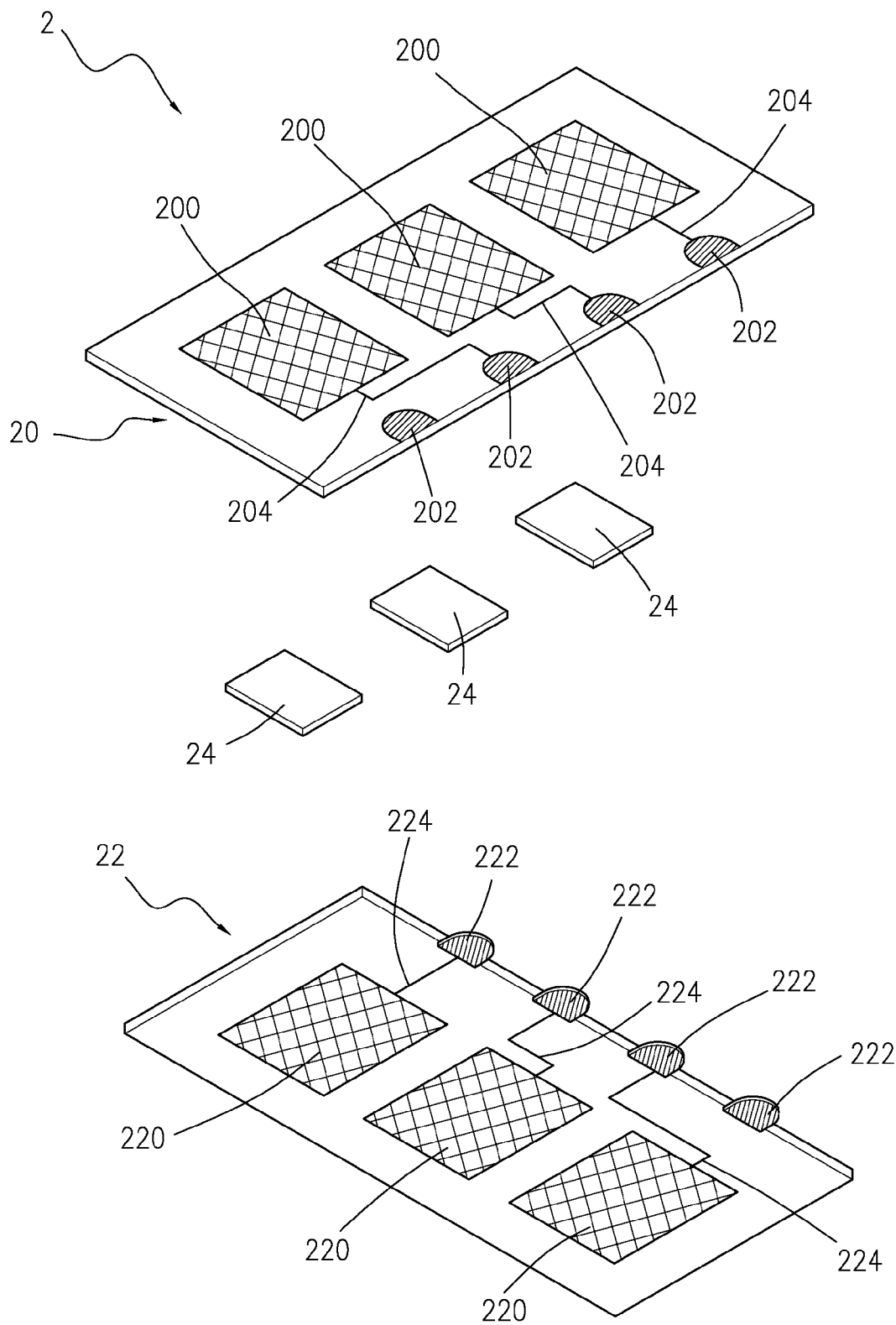
FIG. 2A is an exploded view for a fuel cell with embedded series/parallel mechanism of a second embodiment according to the present invention.
Figure 2B:
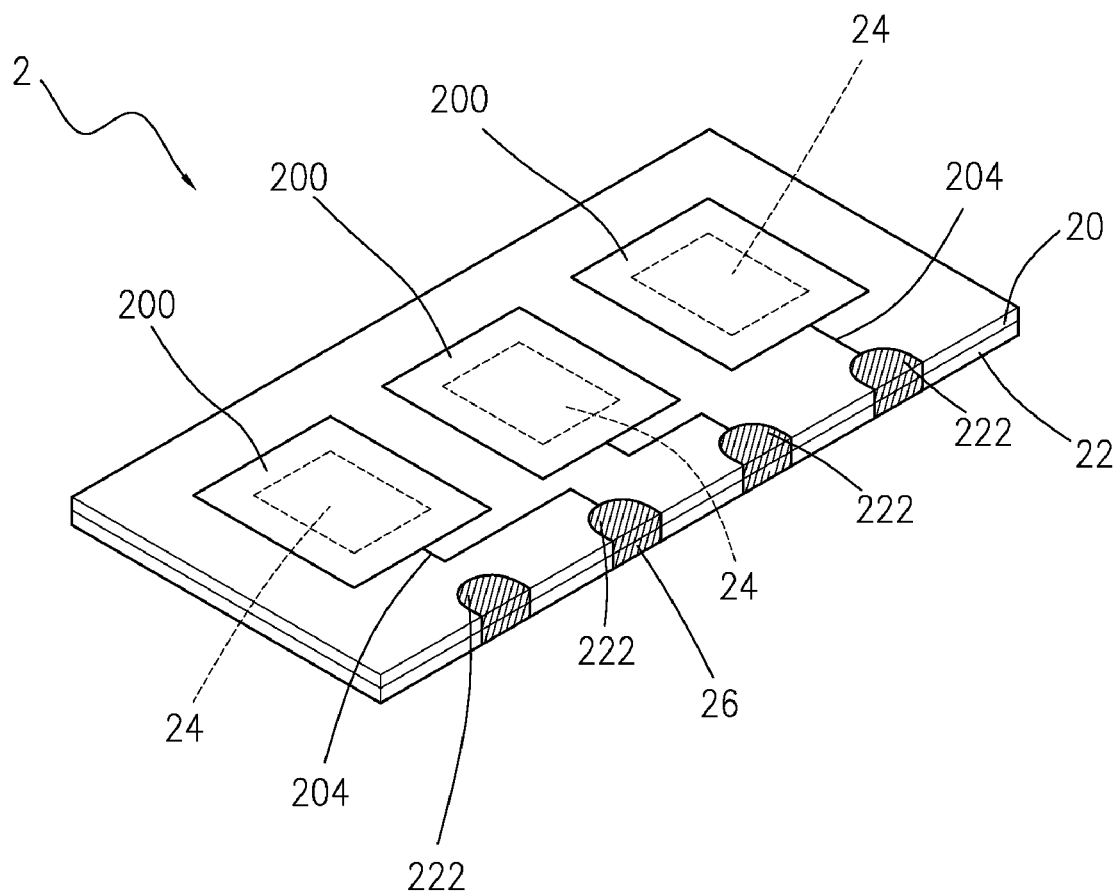
FIG. 2B is an elevation assembly diagram of FIG. 2A.

FIG. 2A is an exploded view for a fuel cell with embedded series/parallel mechanism of a second embodiment according to the present invention, and FIG. 2B is an elevation assembly diagram of FIG. 2A. The fuel cell 2 with embedded series/parallel mechanism 2 according to the present invention mainly comprises: an anode circuit board 20, a cathode circuit board 22, at least one membrane electrode assembly 24; wherein, the anode circuit board 20 and the cathode circuit board 22 could employ the printed circuit board as the substrate, and employ the process for printed circuit board to form at least one anode current collector circuit 200, at least one cathode current collector circuit 220, at least one anode pad 202, at least one anode wiring 204, and at least one cathode wiring 224 on the anode circuit board 20 and on the cathode circuit board 22, respectively; wherein, the anode wiring 204 and the cathode wiring 224 are the printed circuitry, and the anode pad 202 is presented as a pattern of a semi-circle foil or a square foil. Moreover, the cathode circuit board 22 is also provided with at least one pre-attached or spot-welded flexible cathode pad 222, and the flexible cathode pad 222 is also presented as a pattern of a semi-circle foil or a square foil, and a partial area of flexible cathode pad 222 is protruded outside the cathode circuit board 22.

Furthermore, the present invention is to configure these anode pads 202 and these flexible cathode pads 222 at the board edge of anode circuit board 20 and cathode circuit board 22, and these anode pads 202 and these flexible cathode pads 222 are in the relationship of top and down opposite position. The present invention further employs the anode wiring 204 and cathode wiring 224 to connect and conduct each anode current collector circuit 200 with each anode pad 202 one by one, and connect and conduct each cathode current collector circuit 220 with each flexible cathode pad 222 one by one.

When assembling the fuel cell 2 according to the present invention, each membrane electrode assembly 24 is first aligned and placed between each pair of anode current collector circuit 200 and cathode current collector circuit 220 in top and down correspondence; next, bending the protruded area of the flexible cathode pad 222 to be attached on the anode pad 202 in opposite, and conducting the direct spot-welding on the bent and attached cathode pad 222 without solder welding, so as to bond the paired anode pad 202 with the flexible cathode pad 222 together; then, sequentially stacking the anode circuit board 20, these membrane electrode assemblies 24, and the cathode circuit board 22 for pressing. Finally, as shown in FIG. 2B, the flexible cathode pad 222 could cover the anode pad 202, and be bonded with the anode pad 202. Similarly, the second embodiment could also employ the configuration of these anode wirings 204, these anode pads 202, these flexible cathode pads 222, and these cathode wirings 224 to implement various types of series/parallel mechanisms for each membrane electrode assembly in the fuel cell 2.

Figure 3A:
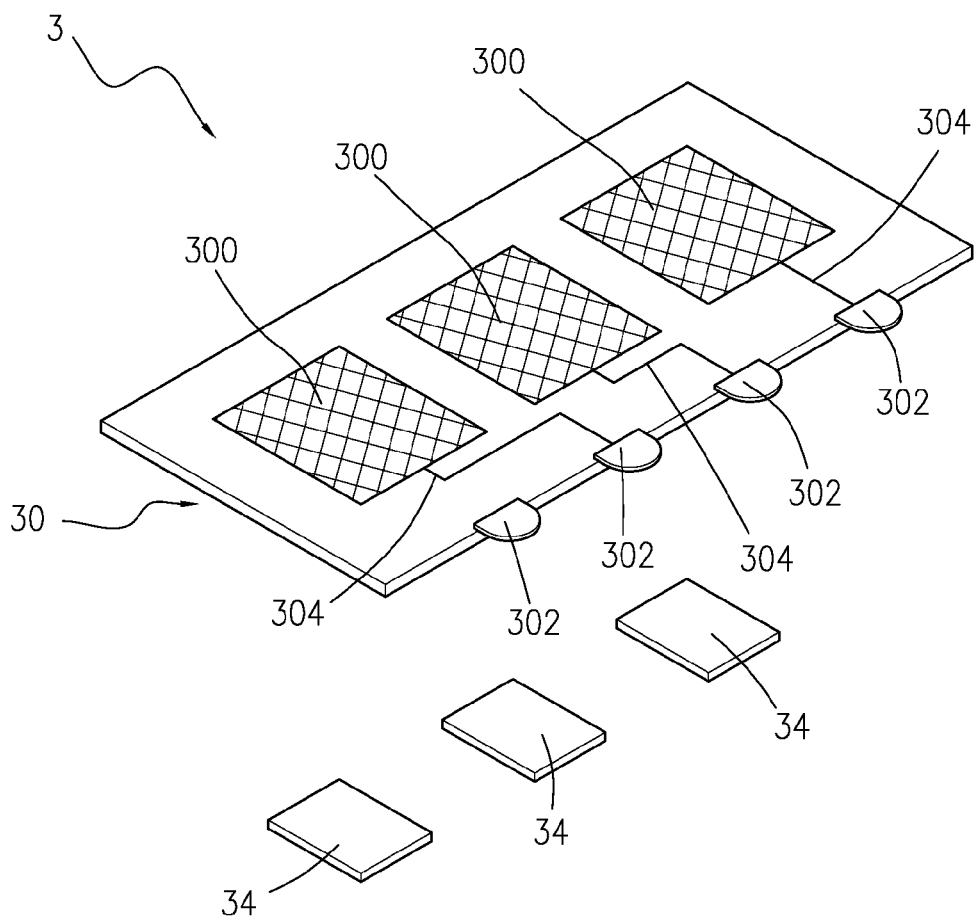
FIG. 3A is an exploded view for a fuel cell with embedded series/parallel mechanism of a third embodiment according to the present invention.
Figure 3A:
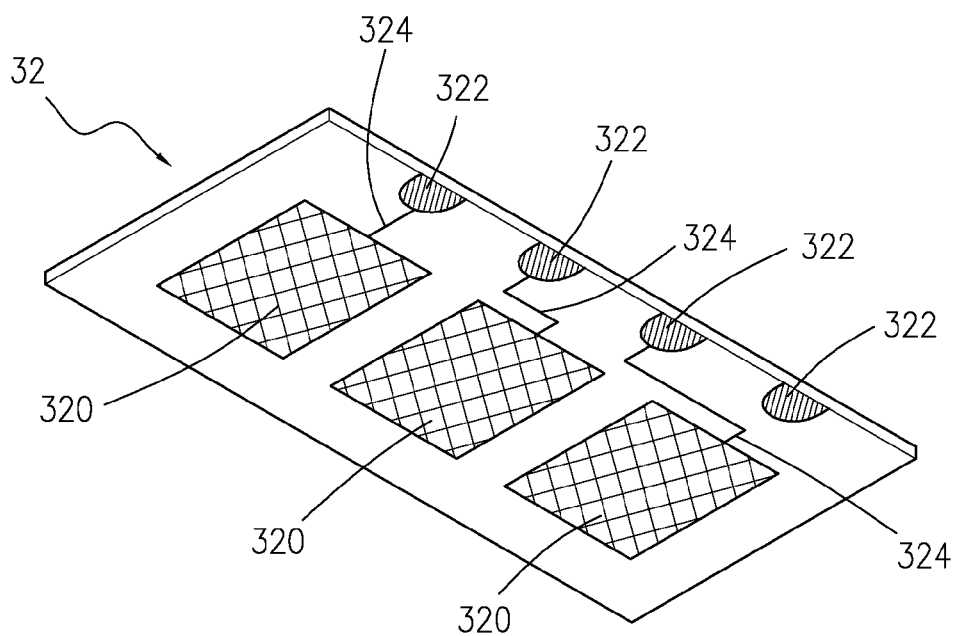
Figure 3B:
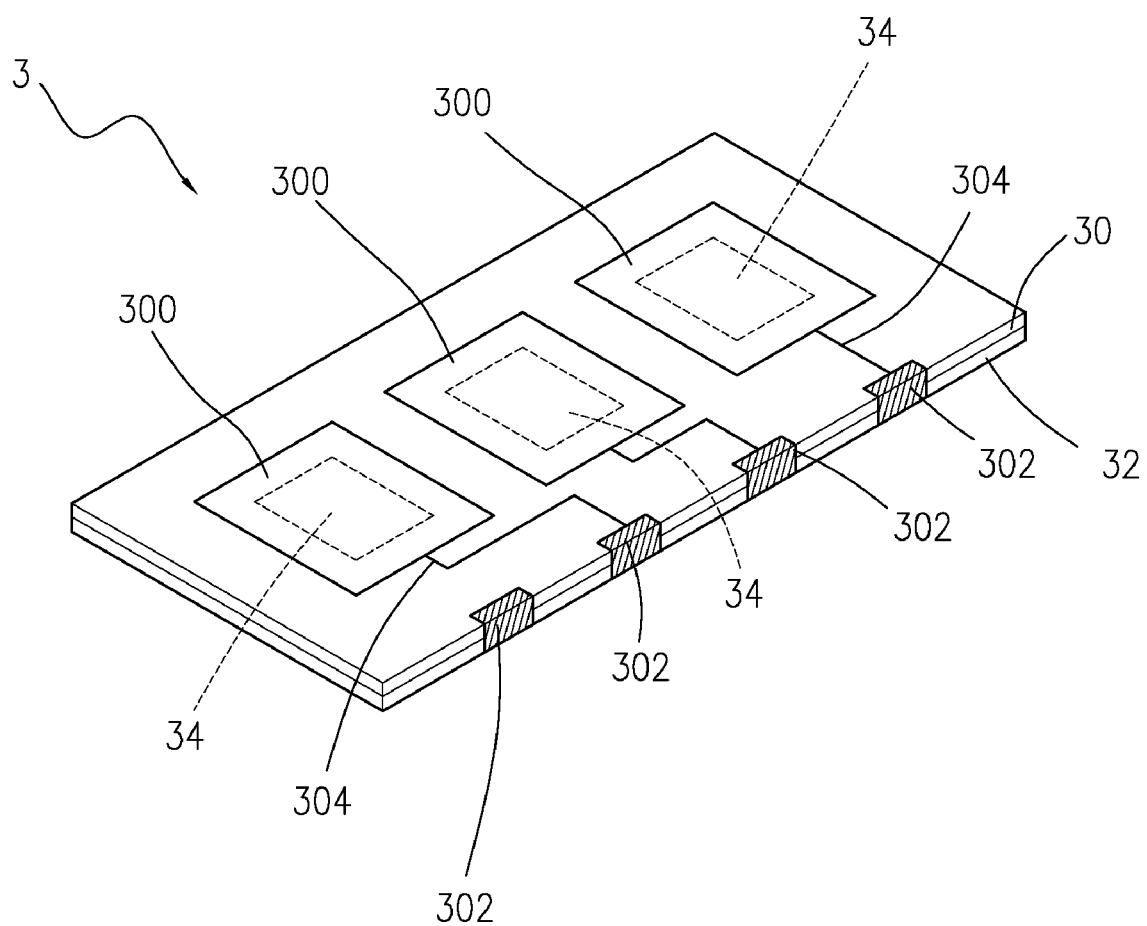
FIG. 3B is an elevation assembly diagram of FIG. 3A.

FIG. 3A is an exploded view for a fuel cell with embedded series/parallel mechanism of a third embodiment according to the present invention, and FIG. 3B is an elevation assembly diagram of FIG. 3A. The fuel cell with embedded series/parallel mechanism 3 according to the present invention mainly comprises: an anode circuit board 30, a cathode circuit board 32, at least one membrane electrode assembly 34; wherein, the anode circuit board 30 and the cathode circuit board 32 could employ the printed circuit board as the substrate, and employ the process for printed circuit board to form at least one anode current collector circuit 300, at least one cathode current collector circuit 320, at least one cathode pad 322, at least one anode wiring 304, and at least one cathode wiring 324 on the anode circuit board 30 and on the cathode circuit board 32, respectively; wherein, the anode wiring 304 and the cathode wiring 324 are the printed circuitry, and the cathode pad 302 is presented as a pattern of a semi-circle foil or a square foil. Moreover, the anode circuit board 30 is also provided with at least one pre-attached or spot-welded flexible anode pad 302, and the flexible anode pad 302 is also presented as a pattern of a semi-circle foil or a square foil, and a partial area of flexible anode pad 302 is protruded outside the anode circuit board 30.

Furthermore, the present invention is especially to configure these flexible anode pads 302 and these cathode pads 322 at the board edge of the anode circuit board 30 and the cathode circuit board 32, respectively, and these flexible anode pads 302 and these cathode pads 322 are in the relationship of top and down opposite position. The present invention further employs the anode wiring 304 and cathode wiring 324 to connect and conduct each anode electricity circuit 300 with each flexible anode pad 302 one by one, and to connect and conduct each cathode current collector circuit 320 with each cathode pad 322 one by one.

When assembling the fuel cell 3 according to the present invention, each membrane electrode assembly 34 is first aligned and placed between each pair of anode current collector circuit 300 and cathode current collector circuit 320 in top and down correspondence; next, bending the protruded area of the flexible anode pad 302 to be attached on the cathode pad 322 in opposite, and conducting the direct spot-welding on the bent and attached anode pad 302 without solder welding, so as to bond the paired flexible anode pad 302 with the cathode pad 322 together; then, sequentially stacking the anode circuit board 30, these membrane electrode assemblies 34, and the cathode circuit board 32 from top to down for pressing. Finally, as shown in FIG. 3B, the flexible anode pad 302 could cover the cathode pad 322, and be bonded with the cathode pad 322. Similarly, the third embodiment could also employ the configuration of these anode wirings 304, these flexible anode pads 302, these cathode pads 322, and these cathode wirings 324 to implement various types of series/parallel mechanisms for each membrane electrode assembly in the fuel cell 3.

Moreover, the anode current collector circuits 100, 200, 300, and the cathode current collector circuits 120, 220, 320 according to the present invention could be configured with a plurality of through-holes (not shown), and with these through-holes, the cathode fuel and anode fuel could flow into the cathode and the anode of each membrane electrode assembly 14, 24, 34, respectively.

The fuel cell with embedded series/parallel mechanism according to the present invention is provided with the following advantages and with the obviously improved effects:

1. The present invention employs an U-shape connection terminal clipped between the anode pad and the cathode pad, and then proceeds the spot-welding directly, which could replace the solder spot-welding method in the prior art, so that the present invention could provide great convenience on the implementation; and 2. The present invention employs a flexible anode pad or a flexible cathode pad, and with the feature of being able to be bent and attached on the opposite pad, it could also proceed the direct spot-welding without solder welding, so as to bond the paired pads together, and for pressing at least. Thus, the present invention could save the operator with the glue scraping operation, which could not only increase the working efficiency, but also ensure the quality of fuel cell.

These disclosed preferred embodiments are presented for the convenience of description and making example. The right scope claimed by the present invention is based on the attached claims, but not limited by these embodiments.

What is claimed is:

1. A fuel cell with embedded series/parallel mechanism, which comprises:
   an anode circuit board including:
      at least one anode current collector circuit;
      at least one anode wiring, in which the anode wirings are electrically connected to the anode current collector circuits, respectively;
      at least one anode pad, and the anode pads are configured at the board edge of the anode circuit board, and the anode pads are electrically connected to the anode wirings;
   a cathode circuit board, including:
      at least one cathode current collector circuit;
      at least one cathode wiring, in which the cathode wirings are electrically connected to the cathode current collector circuits, respectively;
      at least one cathode pad, and the cathode pads are configured at the board edge of the cathode circuit board, and the cathode pads are electrically connected to the cathode wirings, in which each cathode pad is corresponding to one opposite anode pad;
   at least one membrane electrode assembly, which are bonded and sandwiched between the anode circuit board and the cathode circuit board, and the membrane electrode assemblies are sandwiched between the anode current collector circuits and the corresponding cathode current collector circuits;
   at least one U-shape connection terminal, which are clipped between one pair of anode pad and cathode pad in opposite on the anode circuit board and on the cathode circuit board, and the U-shape connection terminal is directly spot-welded and fixed to the paired anode pad and cathode pad without solder welding.

2. The fuel cell according to claim 1, wherein the anode pad is a semi-circle foil, and the cathode pad is a semi-circle foil.

3. The fuel cell according to claim 1, wherein the anode pad is a square foil, and the cathode pad is a square foil.

4. The fuel cell according to claim 1, wherein the anode wiring is a printed circuitry.

5. The fuel cell according to claim 1, wherein the cathode wiring is a printed circuitry.

6. A fuel cell with embedded series/parallel mechanism, which comprises:
   an anode circuit board including:
      at least one anode current collector circuit;
      at least one anode wiring, in which the anode wirings are electrically connected to the anode current collector circuits, respectively;
      at least one flexible anode pad, in which the flexible anode pads are configured at the board edge of the anode circuit board, and a partial area of the flexible anode pad is protruded outside the anode circuit board, and the flexible anode pads are electrically connected to the anode wirings;
   a cathode circuit board, including:
      at least one cathode current collector circuit;
      at least one cathode wiring, in which the cathode wirings are electrically connected to the cathode current collector circuits, respectively;
      at least one cathode pad, and the cathode pads are configured at the board edge of the cathode circuit board, and the cathode pads are electrically connected to the cathode wirings, in which each cathode pad is corresponding to one opposite flexible anode pad;
   at least one membrane electrode assembly, which are bonded and sandwiched between the anode circuit board and the cathode circuit board, and the membrane electrode assemblies are sandwiched between the anode current collector circuits and the corresponding cathode current collector circuits one by one;
   wherein, the protruded area of the flexible anode pad is bent and attached to the cathode pad in opposite, and is conducted with direct spot-welding on the bent and attached anode pad without solder welding, so as to bond the paired flexible anode pad and the cathode pad together.

7. The fuel cell according to claim 6, wherein the flexible anode pad is a semi-circle foil, and the cathode pad is a semi-circle foil.

8. The fuel cell according to claim 6, wherein the flexible anode pad is a square foil, and the cathode pad is a square foil.

9. The fuel cell according to claim 6, wherein the anode wiring is a printed circuitry.

10. The fuel cell according to claim 6, wherein the cathode wiring is a printed circuitry.

11. A fuel cell with embedded series/parallel mechanism, which comprises:
   a cathode circuit board including:
      at least one cathode current collector circuit;
      at least one cathode wiring, in which the cathode wirings are electrically connected to the cathode current collector circuits, respectively;
      at least one flexible cathode pad, in which the flexible cathode pads are configured at the board edge of the cathode circuit board, and a partial area of the flexible cathode pad is protruded outside the cathode circuit board, and the flexible cathode pads are electrically connected to the cathode wirings;
   an anode circuit board, including:
      at least one anode current collector circuit;
      at least one anode wiring, in which the anode wirings are electrically connected to the anode current collector circuits, respectively;
      at least one anode pad, and the anode pads are configured at the board edge of the anode circuit board, and the anode pads are electrically connected to the anode wirings, in which each anode pad is corresponding to one opposite flexible cathode pad;
   at least one membrane electrode assembly, which are bonded and sandwiched between the anode circuit board and the cathode circuit board, and the membrane electrode assemblies are sandwiched between the anode current collector circuits and the corresponding cathode current collector circuits one by one;
   wherein, the protruded area of the flexible cathode pad is bent and attached to the anode pad in opposite, and is conducted with direct spot-welding on the bent and attached cathode pad without solder welding, so as to bond the paired anode pad and the flexible cathode pad together.

12. The fuel cell according to claim 11, wherein the anode pad is a semi-circle foil, and the flexible cathode pad is a semi-circle foil.

13. The fuel cell according to claim 11, wherein the anode wiring is a printed circuitry.

14. The fuel cell according to claim 11, wherein the cathode wiring is a printed circuitry.

15. The fuel cell according to claim 11, wherein the anode pad is a square foil, and the flexible cathode pad is a square foil.

* * * * *